Sept. 29, 1936.  A. F. LARSEN  2,055,868
COOKY DROPPER
Filed Aug. 12, 1935
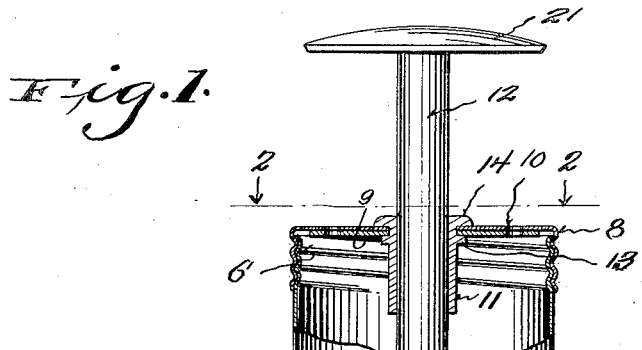
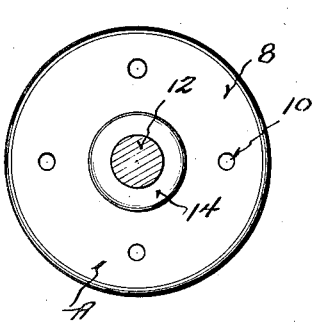
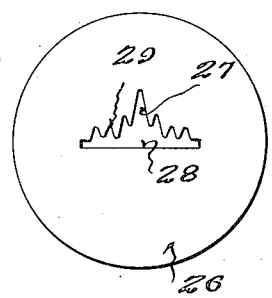
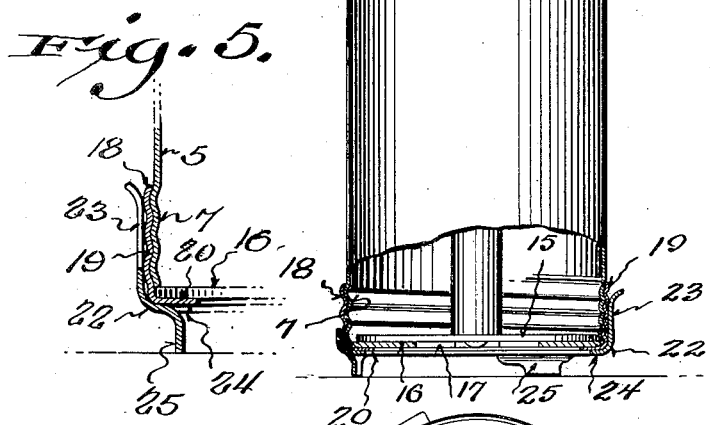
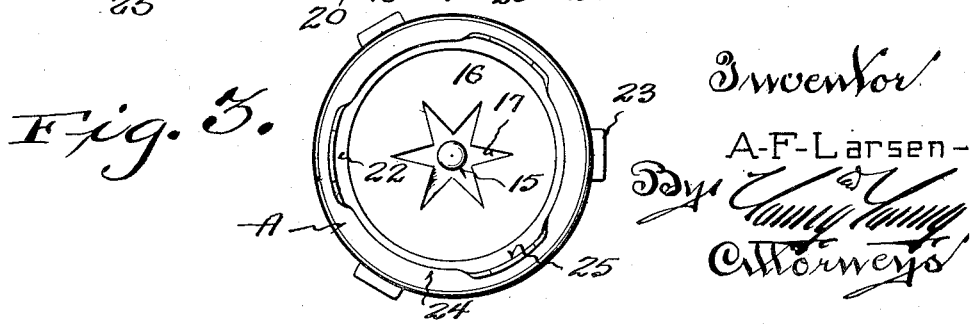

Patented Sept. 29, 1936

2,055,868

UNITED STATES PATENT OFFICE 2,055,868

COOKY DROPPER

Alantser F. Larsen, Manitowoc, Wis., assignor to Aluminum Goods Manufacturing Company, Manitowoc, Wis.

Application August 12, 1935, Serial No. 35,805

1 Claim. (Cl. 107—52)

This invention appertains to a novel device for forming dough, batter, and so forth, in various forms and shapes incident to the baking of cookies and like cakes.

It has heretofore been proposed to provide a cooky forming device including a container or receptacle for receiving dough or batter, with means for forcing the dough or batter from the container through a die detachably carried by one end of the container, with feet rigidly connected to the container for spacing the die from the work table or bake pan. These devices are open to serious objections, in that different thicknesses of cookies cannot be formed, due to the fact that the spacing legs are rigidly carried by the container or retaining ring. Further the parts are hard to clean, and the dough or batter cannot be wiped off clean from the bottom of the container where the feet are rigid therewith. Likewise, with the rigid feet or legs it is awkward or impossible to form a continuous strip of batter or dough of a predetermined form.

It is therefore one of the primary objects of my invention to provide a batter or dough dispenser, including a ferrule or ring detachably holding the desired shaped die on the container, with a removable head carrying rigid spacing feet, a series of heads being provided with different lengths of feet so that cookies of various thickness can be gauged.

Another salient object of my invention is the provision of a batter or dough dispenser having a stamped-out retaining ring provided with resilient clips on one edge for detachable connection with the container or die retaining ferrule, and outwardly projecting spacing feet on the other edge, so that the rings having different lengths of feet can be quickly and easily associated with the container, the quick detachability of the ring permitting the bottom face of the container and die to be wiped clean with a knife, or the like.

A further object of my invention is the provision of a batter or dough container having removable spacing feet, and a die for permitting the dough or batter to be forced therefrom in a continuous strip of the desired shape.

A further object of my invention is to provide a cooky batter or dough dispenser including a cylindrical container, and a plunger for forcing the dough or batter from the container, the container being provided with a removable end head carrying a guide sleeve for the plunger rod, and a reinforcing plate for the head held in place by said sleeve.

A still further object of my invention is to provide a batter or dough dispenser of the above character, which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawing, in which drawing:

Figure 1 is a side elevation of my improved batter or dough dispenser, with parts thereof broken away and in section to illustrate structural details.

Figure 2 is an end elevation of the improved device, with the plunger rod in section, the section being taken substantially on the line 2—2 of Figure 1 looking in the direction of the arrows.

Figure 3 is a bottom plan view of the improved device, showing one form of die connected therewith.

Figure 4 is a plan view of a novel form of die for permitting the dough to be extruded from the container in a continuous strip of fanciful form.

Figure 5 is an enlarged fragmentary section through the lower end of the container.

Referring to the drawing in detail, wherein similar reference characters designate corresponding parts throughout several views, the letter A generally indicates my improved batter dispenser, which includes an elongated cylindrical container 5, the opposite ends of which have formed therein screw threads 6 and 7, respectively. The inner or upper end of the cylindrical container 5 is closed by a removable cap 8, which is fitted on the threads 6. A reinforcing and strengthening plate 9 is placed against the inner face of the closure cap 8, and the cap and plate have formed therein air escape openings 10. A guide sleeve 11 is carried axially by the cap to form an elongated guide bearing for the plunger rod 12. The sleeve 11 adjacent to one end is provided with an annular stop shoulder 13, which is adapted to butt up against the reinforcing plate 9. In fabricating the device the guide sleeve 11 is placed through axial openings in the plate 9 and the cap 8, until the shoulder 13 abuts the plate 9, after which the outer end of the sleeve is upset as at 14 against the outer face of the cap. The inner end of the plunger rod 12 has secured thereto the plunger 15 for forcing the dough or batter from the container 5.

Various kinds of dies 16 are provided for the container. All of the dies include a flat disc-shaped plate preferably formed from metal of the desired gauge. The different plates or dies 16 are formed with differently shaped openings so that different and desired designs can be given to the cookies or cake. As shown in Figure 3, the die or plate 16 is provided with a centrally disposed star-shaped opening 17 through which the dough is extruded by means of the plunger 15 and the rod 12. The desired die is placed against the forward or outer end of the container, and is held in place thereon by means of a threaded ferrule, or the like, 18. This ferrule 18, or the like, includes a threaded annular side wall 19, and an inwardly directed, right-angularly disposed retaining flange 20 for the die.

In assembling the device, the desired plate or die 16 can be placed directly in the ferrule, and then the ferrule can be threaded on the container. The inner or rear end of the plunger 12 can be provided with any desired type of manipulating handle 21.

In accordance with my invention I provide novel means for spacing the die 16 and the bottom of the container from the work table or bake pan, and this means includes a detachable carrying ring 22. The inner edge of the ring is provided at spaced points with resilient fingers or clips 23, which are adapted to snap over the annular side wall of the ferrule 18, and the forward edge of the ring carries an inwardly directed flange 24 provided at spaced points with downwardly extending feet or spacing legs 25. I provide a number of the rings 22 with different lengths of feet or legs 25 so that different thicknesses of cookies can be accurately gauged. All of the spacing rings are formed by the same die, and the legs are trimmed off to the correct length. Obviously the retaining ring with the spacing legs or feet 25 can be quickly removed from the container for facilitating the cleaning of the container and for wiping off dough from the bottom end of the container.

By providing the ring 22 I am also enabled to use my novel die, which is indicated by the reference character 26, and illustrated in Figure 4 of the drawing. This die 26 includes a flat disc of the same diameter as the die 16 previously described, but a special form of die opening 27 is formed therein. This die opening 27 includes a straight, diametrically extending edge 28, which forms the bottom surface of the extruded dough or batter, and an irregular edge 29 of the desired configuration, which forms the top edge of the dough or batter into the preferred shape.

When it is desired to form an elongated strip of dough having a predetermined form, the spacing ring 22 is removed and the die 26 is substituted for the die 16. The plunger is now slowly and continuously forced toward the die 26, and the dough will be extruded in a continuous strip having a flat bottom surface and an ornamental top surface.

From the foregoing description it can be seen that I have manufactured an exceptionally simple and efficient means for extruding the dough in various shapes for forming the cookies and like cakes.

Changes in details may be made without departing from the spirit or scope of this invention, but what I claim as new is:

A batter dispenser comprising a container body having a lower open end, a die fitted against said end, a removable ferrule fitted on the container body against said die for detachably holding the die in place, means for forcing the contents of the container body toward and through the die, and a carrying ring having resilient fingers formed on one edge thereof for releasably gripping the ferrule, and downwardly projecting spacing feet formed on the other edge of the ring and disposed forwardly of the die for spacing the die from a surface.

ALANTSER F. LARSEN.